(12) United States Patent
Wang et al.

(10) Patent No.: US 10,997,928 B1
(45) Date of Patent: May 4, 2021

(54) METHOD, APPARATUS AND STORAGE MEDIUM FOR DETERMINING AMBIENT LIGHT INTENSITY

(71) Applicant: BEIJING XIAOMI MOBILE SOFTWARE CO., LTD., Beijing (CN)

(72) Inventors: Ruyue Wang, Beijing (CN); Chaoxi Chen, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/828,949

(22) Filed: Mar. 24, 2020

(30) Foreign Application Priority Data

Oct. 24, 2019 (CN) .......................... 201911019824.2

(51) Int. Cl.
  *G09G 3/34* (2006.01)
  *H05B 47/11* (2020.01)
  *G01J 1/42* (2006.01)

(52) U.S. Cl.
  CPC ........... *G09G 3/3406* (2013.01); *H05B 47/11* (2020.01); *G01J 1/4204* (2013.01);
  (Continued)

(58) Field of Classification Search
  CPC ..... G09G 2360/144; G09G 2320/0626; G09G 2320/064; G09G 2310/08; G09G 2320/0693; H01L 27/3227; H01L 27/3269; G02F 1/13318; G02F 2001/13312; G01J 1/4204
  See application file for complete search history.

(56) References Cited

U.S. PATENT DOCUMENTS

| 8,933,916 B1* | 1/2015 | Doar ................... G02B 6/0068 345/207 |
| 9,622,326 B1* | 4/2017 | Devyver ................ H05B 47/11 |

(Continued)

FOREIGN PATENT DOCUMENTS

| WO | 2020025612 A1 | 2/2020 |
| WO | 2020025760 A1 | 2/2020 |

OTHER PUBLICATIONS

Extended European Search Report in Application No. 20169916, dated Oct. 7, 2020.

*Primary Examiner* — Sanjiv D. Patel
(74) *Attorney, Agent, or Firm* — Syncoda LLC; Feng Ma

(57) ABSTRACT

A method for determining ambient light intensity includes: acquiring a plurality of light sensing integral values obtained by sampling light intensity with a predetermined light sensing collecting time window and a predetermined sampling frequency through a photosensitive element, wherein the light sensing collecting time window is greater than a screen blanking time of a terminal; determining a minimum light sensing integral value and a maximum light sensing integral value in the plurality of light sensing integral values; determining a light sensing integral value of a photosensitive element which corresponds to an ambient light according to the maximum light sensing integral value, the light sensing collecting time window, the minimum light sensing integral value and the screen blanking time; and determining the ambient light intensity according to the light sensing integral value of the photosensitive element which corresponds to the ambient light and a predetermined light intensity.

14 Claims, 3 Drawing Sheets

(52) U.S. Cl.
 CPC . *G09G 2310/08* (2013.01); *G09G 2320/0633* (2013.01); *G09G 2360/144* (2013.01)

(56) References Cited

U.S. PATENT DOCUMENTS

| | | | |
|---|---|---|---|
| 2008/0284716 A1* | 11/2008 | Edwards | G09G 3/3406 345/102 |
| 2014/0166850 A1* | 6/2014 | Zheng | G09G 3/3406 250/205 |

* cited by examiner

METHOD, APPARATUS AND STORAGE MEDIUM FOR DETERMINING AMBIENT LIGHT INTENSITY

CROSS-REFERENCE TO RELATED APPLICATIONS

This application claims priority to Chinese Patent Application 201911019824.2, filed on Oct. 24, 2019, the disclosure of which is hereby incorporated by reference in its entirety.

BACKGROUND

The mobile device needs to be equipped with a photosensitive element to detect an ambient light intensity.

In general, a photosensitive element is placed on a frame portion of a screen of a mobile terminal, and a narrow-slit solution is used to determine the ambient light intensity. In the process of determining the ambient light intensity by using the narrow-slit solution, a frame having a certain width is required to be set within a field of view (FOV) of the photosensitive element, so as to prevent the screen display light from being received by the photosensitive element after being reflected and projected through the light path, which affects the determination of the ambient light intensity.

SUMMARY

The present disclosure relates generally to the field of display technologies, and more specifically to a method, apparatus, and storage medium for determining an ambient light intensity.

According to a first aspect of embodiments of the present disclosure, there is provided a method for determining an ambient light intensity, which is applied to a terminal comprising a photosensitive element, and the method comprises:

acquiring a plurality of light sensing integral values obtained by sampling a light intensity with a predetermined light sensing collecting time window and a predetermined sampling frequency through the photosensitive element, wherein the light sensing collecting time window is greater than a screen blanking time of the terminal; determining a minimum light sensing integral value and a maximum light sensing integral value in the plurality of light sensing integral values; determining a light sensing integral value of the photosensitive element which corresponds to an ambient light according to the maximum light sensing integral value, the light sensing collecting time window, the minimum light sensing integral value and the screen blanking time; and determining the ambient light intensity according to the light sensing integral value of the photosensitive element which corresponds to the ambient light and a predetermined light intensity.

In some implementations, the light sensing collecting time window has levels, and the levels of the light sensing collecting time window match screen brightness of the terminal.

In some other implementations, the sampling frequency is different from a screen refresh frequency of the terminal.

In yet other implementations, said determining a light sensing integral value of the photosensitive element which corresponds to an ambient light according to the maximum light sensing integral value, the light sensing collecting time window, the minimum light sensing integral value and the screen blanking time comprises:

determining an integral density of the ambient light per unit time according to the maximum light sensing integral value, the light sensing collecting time window, the minimum light sensing integral value and the screen blanking time; and determining a product of the integral density of the ambient light per unit time and the light sensing collecting time window as the light sensing integral value corresponding to the ambient light In yet other embodiments, the maximum light sensing integral value, the light sensing collecting time window, the minimum light sensing integral value, the screen blanking time and the integral density of the ambient light per unit time satisfies the following formula:

$$x=(A-A'+t1*A'/T)/t1,$$

wherein x is the integral density of the ambient light per unit time, A is the minimum light sensing integral value, A' is the maximum light sensing integral value, T is the light sensing collecting time window, and t1 is the screen blanking time.

According to a second aspect of embodiments of the present disclosure, there is provided an apparatus for detecting an ambient light intensity, which is applied to a terminal comprising a photosensitive element, and the apparatus comprises:

an acquisition unit configured to acquire a plurality of light sensing integral values obtained by sampling a light intensity with a predetermined light sensing collecting time window and a predetermined sampling frequency through the photosensitive element, wherein the light sensing collecting time window is greater than a screen blanking time of the terminal; a determination unit configured to determine a minimum light sensing integral value and a maximum light sensing integral value in the plurality of light sensing integral values; and determine a light sensing integral value of the photosensitive element which corresponds to an ambient light according to the maximum light sensing integral value, the light sensing collecting time window, the minimum light sensing integral value and the screen blanking time; and determine the ambient light intensity according to the light sensing integral value of photosensitive element which corresponds to the ambient light and a predetermined light intensity.

In some implementations, the light sensing collecting time window has levels, and the levels of the light sensing collecting time window match screen brightness of the terminal.

In some other implementations, the sampling frequency is different from a screen refresh frequency of the terminal.

In yet other implementations, the determination unit determines a light sensing integral value of the photosensitive element which corresponds to an ambient light according to the maximum light sensing integral value, the light sensing collecting time window, the minimum light sensing integral value and the screen blanking time in the following way:

determining an integral density of the ambient light per unit time according to the maximum light sensing integral value, the light sensing collecting time window, the minimum light sensing integral value and the screen blanking time; and determining a product of the integral density of the ambient light per unit time and the light sensing collecting time window as the light sensing integral value corresponding to the ambient light.

In yet other implementations, the maximum light sensing integral value, the light sensing collecting time window, the minimum light sensing integral value, the screen blanking time and the integral density of the ambient light per unit time satisfies the following formula:

$$x=(A-A'+t1*A'/T)/t1,$$

wherein x is the integral density of the ambient light per unit time, A is the minimum light sensing integral value, A' is the maximum light sensing integral value, T is the light sensing collecting time window, and t1 is the screen blanking time.

According to a third aspect of to embodiments of the present disclosure, there is provided an apparatus for determining ambient light intensity comprising:

a processor; and a memory for storing instructions executable by the processor;

wherein the processor is configured to execute the method for determining an ambient light intensity according to any one of implementations in the above first aspect or second aspect.

According to a fourth aspect of embodiments of the present disclosure, there is provided a non-transitory computer-readable storage medium having stored therein instructions that, when executed by a processor of a mobile terminal, causes the mobile terminal to perform the method for determining an ambient light intensity according to any one of implementations in the above first aspect or second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
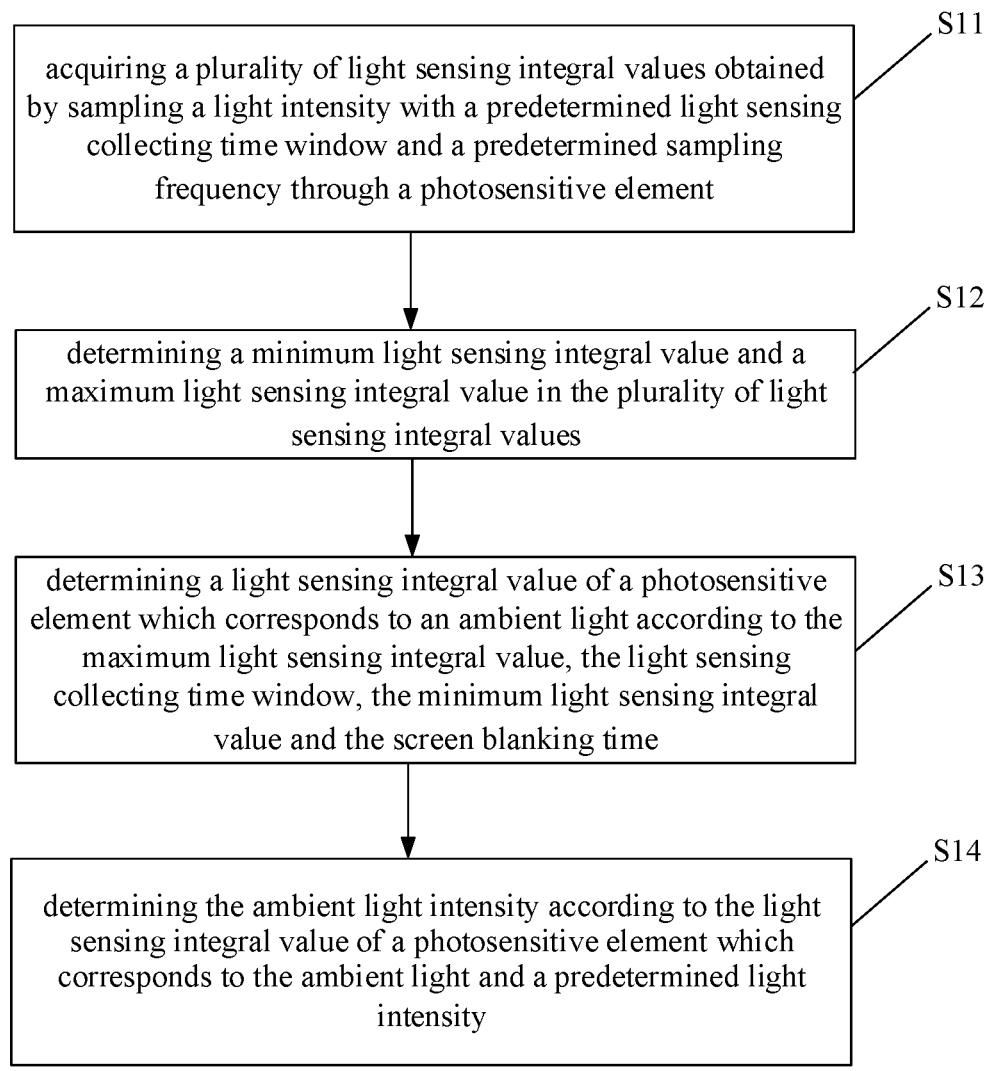
FIG. 1 is a flowchart illustrating a method for determining an ambient light intensity according to an exemplary embodiment.

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

As mentioned above, in the process of determining the ambient light intensity by using the narrow-slit solution, a frame having a certain width is required to be set within a field of view (FOV) of the photosensitive element, so as to prevent the screen display light from being received by the photosensitive element after being reflected and projected through the light path, which affects the determination of the ambient light intensity. However, there is an increasing demanding in a screen display ratio of the mobile device, and setting the frame having a certain width on the screen will inevitably affect the screen display ratio.

The method for determining an ambient light intensity provided in the embodiments of the present disclosure can be applied to a scenario where a terminal with a display screen determines the ambient light intensity. In the exemplary embodiments described below, the terminal is sometimes also referred to as a smart terminal device, where the terminal can be a mobile terminal and can also be referred to as User Equipment (UE), Mobile Station (MS), etc. A terminal is a device that provides a voice and/or data connection to a user, or a chip set in the device, such as a handheld device with a wireless connection function, a vehicle-mounted device, etc. For example, examples of terminals can include: mobile phones, tablets, laptops, PDAs, Mobile Internet Devices (MID), wearable devices, Virtual Reality (VR) devices, Augmented Reality (AR) device, wireless terminals in industrial control, wireless terminals in unmanned driving, wireless terminals in remote surgery, wireless terminals in smart grid, wireless terminals in transportation security, wireless terminals in smart cities, wireless terminal in smart homes, etc.

In order to determine the ambient light intensity, a light sensor such as an ambient light sensor is usually provided in the terminal. In the related art, a photosensitive element is placed on a frame portion of a screen of a mobile terminal. For example, when the screen of the terminal is a display screen with upper and lower frames, the photosensitive element can be placed on the upper frame of the display screen. When the screen of the terminal is a display screen in a form of a fringe screen, the ambient light sensor can be placed in the fringe area. The terminal screen display ratio has become more and more demanding. If a photosensitive element can be placed at the bottom of the screen, that is, forming an under-screen photosensitive element, the terminal screen display ratio will be greatly improved. However, when the under-screen photosensitive element determines the ambient light intensity, the light leakage displayed on the screen is detected, which affects the determination of the ambient light intensity In the related art, the photosensitive element collects light intensity at a specified sampling frequency and integration time to acquire a light sensing integral value. The light sensing integral value sampled by the photosensitive element is used to determine the light sensing integral value of a photosensitive element which corresponds to the ambient light. The ambient light intensity can be determined according to the light sensing integral value of a photosensitive element which corresponds to the ambient light and the predetermined light intensity. Herein, a sampling frequency of the photosensitive element can be understood as that the photosensitive element integrates the photocurrent on the device into a digital signal. The sampling frequency is generally around 2 kHz, and about 10 groups of data can be acquired in one screen refresh period. The light sensing integral time can be understood as the time that the light sensing device converts the photocurrent into a digital signal.

In view of this, there is provided a method for determining an ambient light intensity in the embodiments of the present disclosure. In the method for determining the ambient light intensity provided in the embodiments of the present disclosure, a light sensing collecting time window and a sampling frequency of the light intensity collected by the photosensitive element are determined based on the screen blanking time during a process of driving screen display of a terminal, so that the photosensitive element collects the light intensity within the screen blanking time during the process of driving screen display of a terminal. When determining the ambient light intensity, based on the plurality of light sensing integral values of the light intensity sampled by the photosensitive element with a predetermined light sensing collecting time window and a predetermined sampling frequency, the effect of screen brightness caused by screen light leakage detected by the photosensitive element is removed, thereby achieving an accurate determination of the ambient light intensity. The determination of the ambient light intensity can be achieved under the influence of light leakage from the screen in the embodiments of the present disclosure, so that it does not require to set a frame having a certain width to determine the ambient light intensity, and the photosensitive element can be placed at the bottom of the screen, thereby increasing the screen display ratio of the terminal.

FIG. 1 is a flowchart illustrating a method for determining an ambient light intensity according to an exemplary embodiment. As shown in FIG. 1, the method for determining an ambient light intensity is applied to the terminal, and the method includes the following steps.

In step S11, a plurality of light sensing integral values obtained by sampling a light intensity with a predetermined light sensing collecting time window and a predetermined sampling frequency through a photosensitive element are acquired.

In the embodiments of the present disclosure, a light sensing collecting time window and a sampling frequency of the photosensitive element for light intensity collection can predetermined. Since the screen display of terminal is driven by a Pulse Width Modulation (PWM) signal, the screen is not always lit when the screen display is driven by the PWM signal. In order to display different contents, the screen is refreshed at a fixed screen refresh frequency. A screen refresh is a process in which the driver circuit controls the screen to turn off and then turn on again. A time period when the screen is completely off during the screen refresh process is called the screen-off (screen blanking) time, and a time period when the screen is completely on is called the screen-on time. The refresh frequency is generally 240 Hz/60 Hz. The light delay that is recognizable by the human eye is about 10 ms. If the time that the screen is completely off during the refresh process is within 10 ms, it cannot be recognized by the naked eye. It can be seen subjectively that the screen is always on. When the screen brightness is adjusted from dark to bright, it is actually the effect that the screen-on time of the screen becomes longer and the screen blanking time is shortened.

In the case that the screen refresh frequency is fixed, the average current is adjusted by adjusting the ratio of the high level and low level of the driving signal, so as to achieve different brightness visible to the human eyes. Herein, when the PWM signal is at a high level, the screen is in a screen-on state. When the PWM signal is at a low level, the screen is in a screen blanking state. In the case where the screen is in the screen blanking state, the light leakage will not be detected, when the photosensitive element determines the ambient light intensity. Therefore, in the present disclosure, a screen blanking time can be determined, and a light sensing collecting time window and a sampling frequency that enable the photosensitive element to collect the light intensity within the screen blanking time in the process of driving the screen display of terminal can be set in advance according to the screen blanking time, thereby determining the ambient light intensity.

Herein, in order to ensure that the light intensity is collected by the photosensitive element within the screen blanking time in the process of driving the screen display of a terminal to, it is set in the embodiments of the present disclosure that the light sensing collecting time window is greater than the screen blanking time of the terminal.

In the embodiments of the present disclosure, the photosensitive element collects a plurality of light intensities with a predetermined light sensing collecting time window and a predetermined sampling frequency to acquire a plurality of light sensing integral values.

In step S12, a minimum light sensing integral value and a maximum light sensing integral value in the plurality of light sensing integral values are determined.

In the implementations of the present disclosure, when the photosensitive element collects the light intensity with a predetermined light sensing collecting time window and a predetermined sampling frequency, the light intensities including different proportions of screen light and ambient light can be collected, in which there are the light intensities including the entire screen blanking time, and the light intensities not including the screen blanking time at all; and the collected screen brightness are different, and the light intensities are also different.

For example, when the screen display brightness is extremely low, the light sensing collecting time window is less than the screen blanking time, and the photosensitive element will collect the light intensity which does not include the screen brightness but includes the ambient light brightness. When the screen display brightness is relatively high, the light sensing collecting time window is greater than the screen blanking time, and the light intensity which includes the screen brightness and the ambient light brightness can be collected.

In the embodiments of the present disclosure, a plurality of light sensing integral values corresponding to a plurality of light intensities sampled by a photosensitive element with a predetermined light sensing collecting time window and a predetermined sampling frequency are acquired, and the maximum light sensing integral value and minimum light sensing integral value in the plurality of light sensing integral values can be determined.

In step S13, a light sensing integral value of a photosensitive element which corresponds to an ambient light according to the maximum light sensing integral value, the light sensing collecting time window, the minimum light sensing integral value and the screen blanking time is determined.

In some embodiments of the present disclosure, the minimum light sensing integral value can be theoretically a light sensing integral value including the entire screen blanking time, and includes the light-sensitive integral value corresponding to a small portion of the screen light brightness and the ambient light brightness. The maximum light sensing integral value is a light sensing integral value corresponding to the light intensity including both the screen brightness and the ambient light brightness. A light sensing integral value of a photosensitive element which corresponds to the ambient light is determined according to the minimum light sensing integral value, the maximum light sensing integral value, the light sensing collecting time window and the screen blanking time, which can meet the requirements of determining the environment light intensity and also meet the requirements of achieving a larger screen display ratio.

In step S14, the ambient light intensity is determined according to the light sensing integral value of a photosensitive element which corresponds to the ambient light and a predetermined light intensity.

In some embodiments of the present disclosure, after the light sensing integral value of a photosensitive element which corresponds to the ambient light is acquired, the detected ambient light intensity can be determined according to the predetermined light intensity and the light sensing integral value of a photosensitive element which corresponds to the ambient light. For example, traditional technology is used to obtain the ambient light intensity according to the fitted curve of the light sensing integral value of a photosensitive element which corresponds to the ambient light and the light intensity. Herein, when the determination of the ambient light intensity is performed, the light intensity that is fitted with the light sensing integral value of a photosensitive element which corresponds to the ambient light can be different light brightness adjusted by a light source of a light box.

In some embodiments of the present disclosure, the light intensities that are obtained by the photosensitive element sampling a light intensity with a predetermined light sensing collecting time window and a predetermined sampling frequency are used to determine the ambient light intensity, thereby determining the ambient light intensity on a basis of time window, which will not be affected by the screen light leakage, and thus, it does not require to set a frame having a certain width, thereby the screen display ratio can be improved.

Some embodiments of the present disclosure will be described below in conjunction with practical applications of the above-mentioned methods for determining the ambient light intensity.

In some exemplary embodiments of the present disclosure, in order to make the light sensing collecting time window and sampling frequency meet the requirement that the light intensity within the screen blanking time in the process of driving the screen display of a terminal is collected, the sampling frequency can be set different from the refresh frequency of the terminal screen.

The screen brightness collected by the photosensitive element is different at different screen brightness in some embodiments of the present disclosure. In order to improve the accuracy of the light intensity collected by the photosensitive element in the present disclosure, different light sensing collecting time windows can be set for different screen brightness. In other words, the light sensing collecting time windows have levels, and different levels of light sensing collecting time windows correspond to different screen brightness. When setting the light sensing collecting time window, the level of the light sensing collecting time window is set to match the screen brightness of the terminal.

In some embodiments of the present disclosure, the implementation process of determining the ambient light intensity according to the minimum light sensing integral value, the maximum light sensing integral value, the light sensing collecting time window and the screen blanking time is described.

Figure 2:
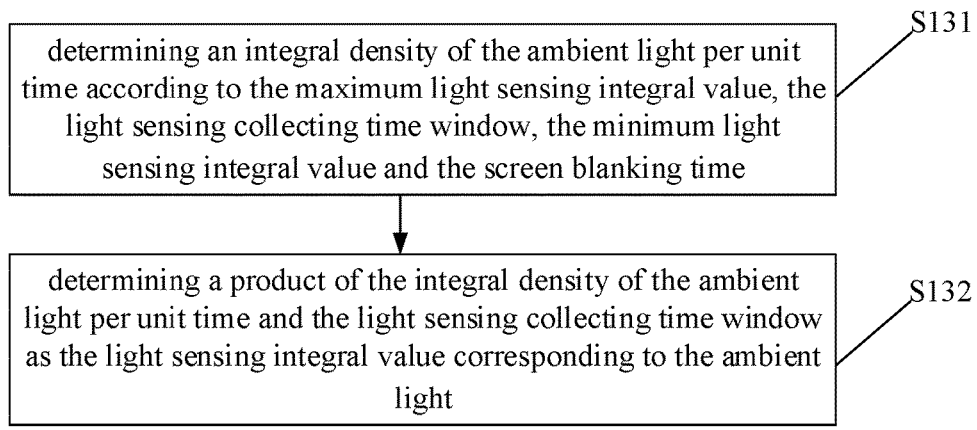
FIG. 2 is a flowchart illustrating a method for determination of a light sensing integral value of a photosensitive element which corresponds to an ambient light according to an exemplary embodiment.

FIG. 2 is a flowchart illustrating a method for determination of a light sensing integral value of a photosensitive element which corresponds to an ambient light according to an exemplary embodiment. Referring to FIG. 2, the method includes the following steps:

In step S131, an integral density of the ambient light per unit time is determined according to the maximum light sensing integral value, the light sensing collecting time window, the minimum light sensing integral value and the screen blanking time.

In step S132, a product of the integral density of the ambient light per unit time and the light sensing collecting time window is determined as the light sensing integral value corresponding to the ambient light.

In some embodiments of the present disclosure, the above-mentioned implementation process of determining the integral density of the ambient light per unit time and the light sensing integral value of the photosensitive element which corresponds to the ambient light is described below.

Figure 3:
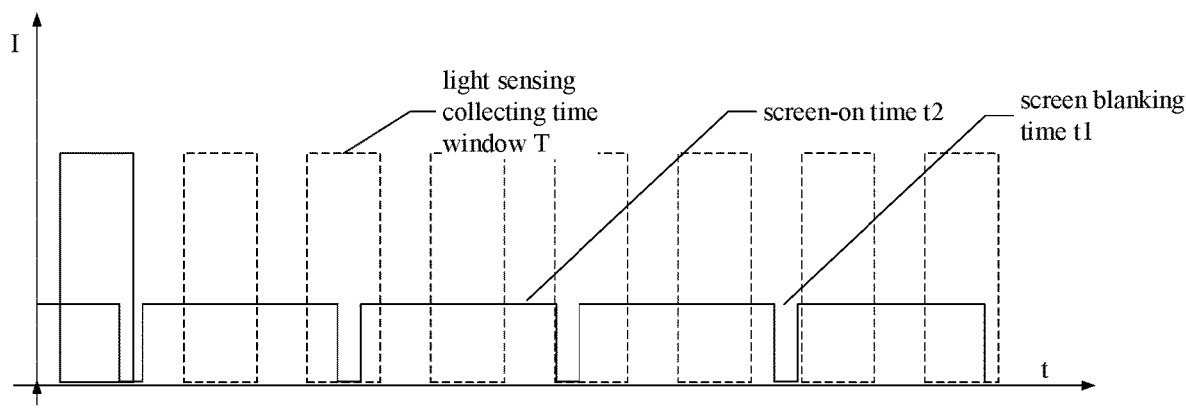
FIG. 3 is a schematic diagram illustrating a light intensity collection on a basis of a light sensing collecting time window according to an exemplary embodiment.

FIG. 3 is a schematic diagram illustrating a light intensity collection on a basis of a light sensing collecting time window according to an exemplary embodiment. In FIG. 3, the light sensing collecting time window T is a set integration time, t1 is a screen blanking time, and t2 is the screen display driving screen-on time. The light intensity collected by the photosensitive element in within t1 includes only the ambient light brightness. The light intensity collected by the photosensitive element within time t2 includes ambient light brightness and screen brightness. When the photosensitive element collects the light intensity with a fixed sampling frequency and an integration time, a plurality of collected light intensities are used as a group. The light sensing collecting time window T is divided into two parts, the first part is t1, and the second part is t3=T−t1. The light intensity collected within time t1 corresponds to the light sensing integral value B, and a sum of the ambient light brightness and the screen brightness within time t3 corresponds to the light sensing integral value C. The light sensing integral value B and the light sensing integral value C correspond to the light sensing integral value A corresponding to the light intensity collected in the light sensing collecting time window T. It is assumed that the smallest light intensity A in the group is the light intensity collected during the light sensing collecting time window T including the entire screen blanking time t1. The maximum light intensity A' in the group is the light intensity collected during the entire bright screen time t2 collected in the light sensing collecting time window T. Assuming that the integral density of ambient light per unit time is x and the integral density of screen light per unit time is y, then:

$$x*t1+(x+y)*t3=B+C=A$$

$$t1+t3=T$$

$$(x+y)*T=A'$$

Since T, t1, A, A' are known, the integral density x of the ambient light per unit time can be obtained by solving:

$$x=(A-A'+t1*A'/T)/t1$$

where x is the integral density of the ambient light per unit time, A is the minimum light sensing integral value, A' is the maximum light sensing integral value, T is the light sensing collecting time window, and t1 is the screen blanking time.

Furthermore, the light sensing integral value ADC of the photosensitive element which corresponds to the ambient light corresponding to pure ambient light in an integration time can be expressed as:

$$ADC=x*T=(A-A')*T/t1+A',$$

wherein ADC is the light sensing integral value of the photosensitive element which corresponds to the ambient light (it can also be understood as the photosensitive element light sensing integral value without removing the effect of the screen light), A is the minimum light sensing integral value sampled by the photosensitive element, and A' is the maximum light sensing integral value sampled by the photosensitive element, T is the light sensing collecting time window, and t1 is the screen blanking time.

Based on the same concept, there is provided an apparatus for determining an ambient light intensity in some embodiments of the present disclosure.

It can be understood that, in order to implement the above functions, the apparatus for determining an ambient light intensity provided in some embodiments of the present disclosure includes hardware structures and/or software modules for implementing various functions. With reference to the units and algorithm steps of various examples disclosed in some embodiments of the present disclosure, some embodiments of the present disclosure can be implemented in a form of hardware or a combination of hardware and computer software. Whether a certain function is performed by the hardware or the combination of hardware and computer software depends on the specific application and design constraints of the technical solution. Those skilled in the art can use different methods to implement the described functions for each specific application, but such implementations should not be considered to be beyond the scope of the technical solutions of some embodiments of the present disclosure.

Figure 4:
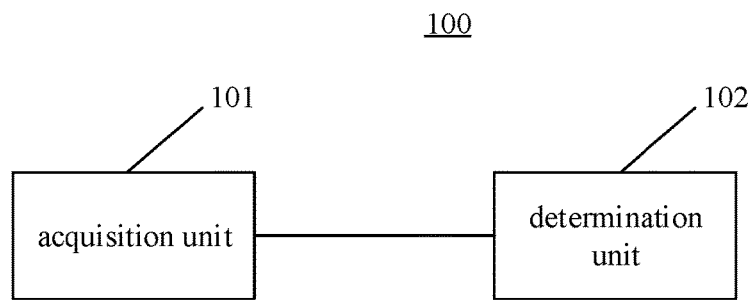
FIG. 4 is a block diagram of an apparatus for determining an ambient light intensity according to an exemplary embodiment.

FIG. 4 is a block diagram of an apparatus for determining an ambient light intensity according to an exemplary embodiment. Referring to FIG. 4, an apparatus for detecting an ambient light intensity 100 is applied to a terminal comprising an under-screen photosensitive element. The apparatus for detecting an ambient light intensity 100 includes an acquisition unit 101 and a determination unit 102.

The acquisition unit 101 is configured to acquire a plurality of light sensing integral values obtained by sampling a light intensity with a predetermined light sensing collecting time window and a predetermined sampling frequency through the photosensitive element, wherein the light sensing collecting time window is greater than a screen blanking time of the terminal. The determination unit 102 is configured to determine a minimum light sensing integral value and a maximum light sensing integral value in the plurality of light sensing integral values; and determine a light sensing integral value of a photosensitive element which corresponds to an ambient light according to the maximum light sensing integral value, the light sensing collecting time window, the minimum light sensing integral value and the screen blanking time; and determine the ambient light intensity according to the light sensing integral value of the photosensitive element which corresponds to the ambient light and a predetermined light intensity.

In an implementation, the light sensing collecting time window has levels, and the levels of the light sensing collecting time window match screen brightness of the terminal.

In another implementation, the sampling frequency is different from a screen refresh frequency of the terminal.

In yet another implementation, the determination unit 102 determines a light sensing integral value of a photosensitive element which corresponds to an ambient light according to the maximum light sensing integral value, the light sensing collecting time window, the minimum light sensing integral value and the screen blanking time in the following way:

determining an integral density of the ambient light per unit time according to the maximum light sensing integral value, the light sensing collecting time window, the minimum light sensing integral value and the screen blanking time. A product of the integral density of the ambient light per unit time and the light sensing collecting time window is determined as the light sensing integral value corresponding to the ambient light.

In yet another implementation, the maximum light sensing integral value, the light sensing collecting time window, the minimum light sensing integral value, the screen blanking time and the integral density of the ambient light per unit time satisfies the following formula:

$$x=(A-A'+t1*A'/T)/t1,$$

wherein x is the integral density of the ambient light per unit time, A is the minimum light sensing integral value, A' is the maximum light sensing integral value, T is the light sensing collecting time window, and t1 is the screen blanking time.

With respect to the apparatus in the above embodiments, the specific manners for performing operations for individual modules therein have been described in detail in some embodiments regarding those methods, which will not be elaborated here.

Figure 5:
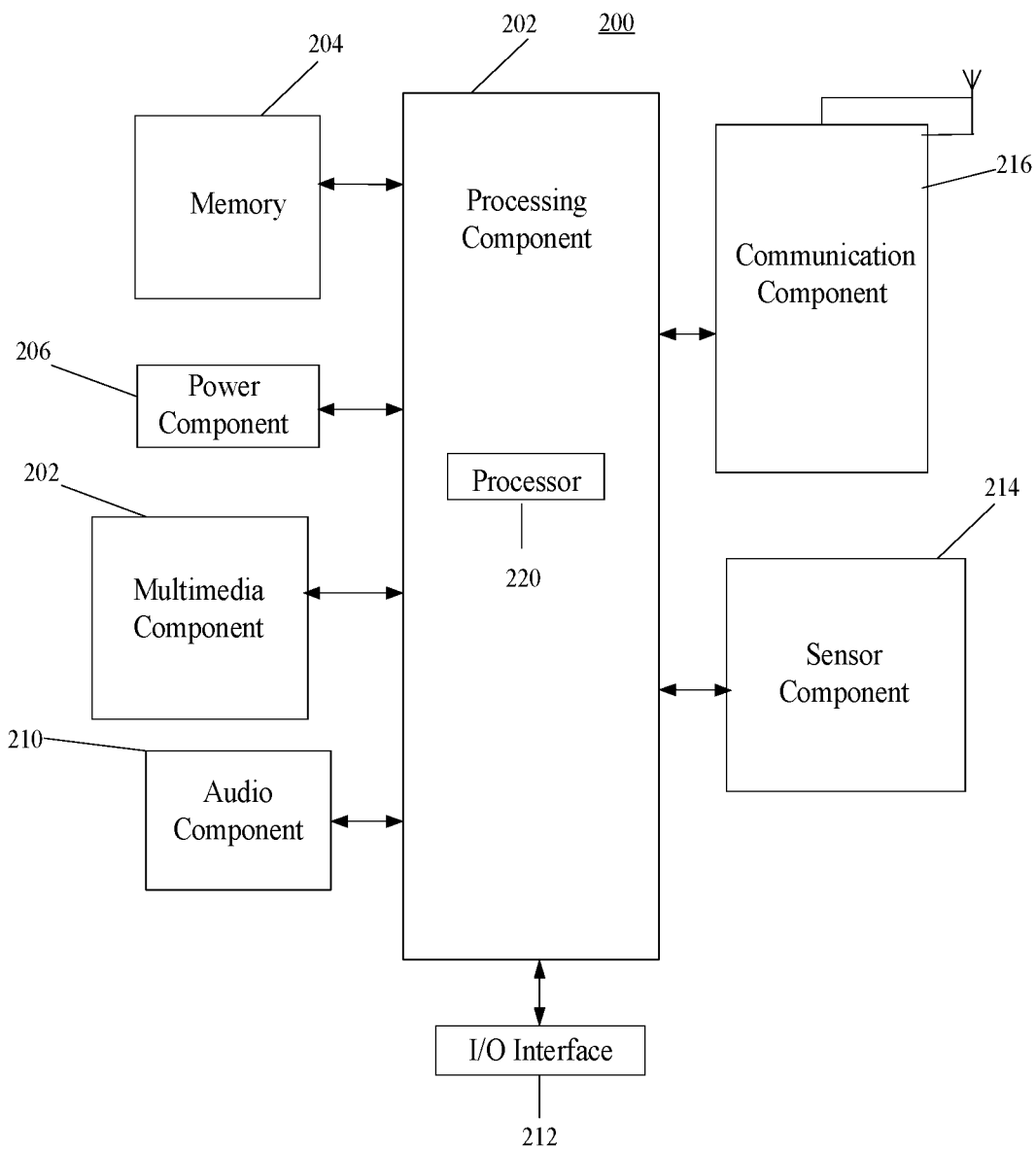
FIG. 5 is a block diagram of an apparatus for determining an ambient light intensity according to an exemplary embodiment.

FIG. 5 is a block diagram of an apparatus 200 for determining an ambient light intensity according to an exemplary embodiment. For example, the apparatus 200 for determining an ambient light intensity can be a mobile phone, a computer, a digital broadcast terminal, a messaging device, a gaming console, a tablet, a medical device, exercise equipment, a personal digital assistant, and the like.

Referring to FIG. 5, the apparatus 200 for determining an ambient light intensity can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the apparatus 200 for determining an ambient light intensity, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the apparatus 200 for determining an ambient light intensity. Examples of such data include instructions for any applications or methods operated on the apparatus 200 for determining an ambient light intensity, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the apparatus 200 for determining an ambient light intensity. The power component 206 can include a power management system, one or more power sources, and any other components associated with the generation, management, and distribution of power in the apparatus 200 for determining an ambient light intensity.

The multimedia component 208 includes a screen providing an output interface between the apparatus 200 for determining an ambient light intensity and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive an external multimedia datum while the apparatus 200 for determining an ambient light intensity is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone ("MIC") configured to receive an external audio signal when the apparatus 200 for determining an ambient light intensity is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide status assessments of various aspects of the apparatus 200 for determining an ambient light intensity. For instance, the sensor component 214 can detect an open/closed status of the apparatus 200 for determining an ambient light intensity, relative positioning of components, e.g., the display and the keypad, of the apparatus 200 for determining an ambient light intensity, the sensor component 214 can also detect a change in position of the apparatus 200 for determining an ambient light intensity or a component of the apparatus 200 for determining an ambient light intensity, a presence or absence of user contact with the apparatus 200 for determining an ambient light intensity, an orientation or an acceleration/deceleration of the apparatus 200 for determining an ambient light intensity, and a change in temperature of the apparatus 200 for determining an ambient light intensity. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate communication, wired or wirelessly, between the apparatus for determining an ambient light intensity 200 and other devices. The apparatus for determining an ambient light intensity 200 can access a wireless network based on a communication standard, such as Wi-Fi, 2G, 3G, 4G, 5G and a combination thereof. In one exemplary embodiment, the communication component 216 receives a broadcast signal or broadcast associated information from an external broadcast management system via a broadcast channel. In one exemplary embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 200 for determining an ambient light intensity can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 204, executable by the processor 220 in the apparatus 200 for determining an ambient light intensity, for performing the above-described methods. For example, the non-transitory computer-readable storage medium can be a ROM, a RAM, a CD-ROM, a magnetic tape, a floppy disc, an optical data storage device, and the like.

Various embodiments of the present disclosure can have one or more of the following advantages: a light sensing integral value of a photosensitive element which corresponds to the ambient light can be determined, by using a maximum light sensing integral value and a minimum light sensing integral value in a plurality of light sensing integral values obtained by sampling the light intensity with a predetermined light sensing collecting time window and a predetermined sampling frequency through the photosensitive element, as well as a light sensing collecting time window and a screen blanking time in the embodiments of the present disclosure, thereby determining the ambient light intensity. The determination of the ambient light intensity on a basis of time window is realized and is not affected by the screen light leakage, and thus it is no longer necessary to set a frame with a certain width, and the screen display ratio can be improved.

It can be understood that the singular forms "a," "the," and "said" may be intended to include the plural forms as well, unless the context clearly indicates otherwise in the present disclosure.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Other implementation solutions of the present disclosure will be apparent to those skilled in the art from consideration of the specification and practice of the embodiments of the present disclosure. This disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

In the embodiments of the present disclosure, the feed object of each feed port is changed through a shift function of the radio frequency switch, thereby forming different antenna arrays in different states and extending coverage of the antenna array. Compared with the technical solution that each antenna array includes fixed array elements in the related art, an arraying manner for the antenna array in the embodiment of the present disclosure is more flexible.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example.

In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for determining an ambient light intensity, applied to a terminal comprising a photosensitive element, and the method comprising:
   acquiring a plurality of light sensing integral values obtained by sampling a light intensity with a predetermined light sensing collecting time window and a predetermined sampling frequency through the photosensitive element, wherein the light sensing collecting time window is greater than a screen blanking time of the terminal;
   determining a minimum light sensing integral value and a maximum light sensing integral value in the plurality of light sensing integral values;
   determining a light sensing integral value of the photosensitive element which corresponds to an ambient light according to the maximum light sensing integral value, the light sensing collecting time window, the minimum light sensing integral value and the screen blanking time; and
   determining the ambient light intensity according to the light sensing integral value of photosensitive element which corresponds to the ambient light and a predetermined light intensity,
   wherein said determining a light sensing integral value of the photosensitive element which corresponds to an ambient light according to the maximum light sensing integral value, the light sensing collecting time window, the minimum light sensing integral value and the screen blanking time comprises:
   determining an integral density of the ambient light per unit time according to the maximum light sensing integral value, the light sensing collecting time window, the minimum light sensing integral value and the screen blanking time; and
   determining a product of the integral density of the ambient light per unit time and the light sensing collecting time window as the light sensing integral value of the photosensitive element which corresponds to the ambient light, and
   wherein the maximum light sensing integral value, the light sensing collecting time window, the minimum light sensing integral value, the screen blanking time and the integral density of the ambient light per unit time satisfies:

$$x=(A-A'+t1*A'/T)/t1,$$

where x is the integral density of the ambient light per unit time, A is the minimum light sensing integral value, A' is the maximum light sensing integral value, T is the light sensing collecting time window, and t1 is the screen blanking time.

2. The method according to claim 1, wherein the light sensing collecting time window has levels, and the levels of the light sensing collecting time window match screen brightness of the terminal.

3. The method according to claim 1, wherein the sampling frequency is different from a screen refresh frequency of the terminal.

4. The method according to claim 2, wherein the sampling frequency is different from a screen refresh frequency of the terminal.

5. A device implementing the method for determining an ambient light intensity according to claim 1, comprising:
   a processor; and
   memory storing instructions for execution by the processor to execute operations of the method.

6. The device according to claim 5 wherein the light sensing collecting time window has levels, and the levels of the light sensing collecting time window match screen brightness of the terminal.

7. The device according to claim 5, wherein the sampling frequency is different from a screen refresh frequency of the terminal.

8. The device according to claim 6, wherein the sampling frequency is different from a screen refresh frequency of the terminal.

9. A non-transitory computer-readable storage medium having instructions stored thereon for execution by a processor of a mobile terminal to enable the mobile terminal to perform a method for determining an ambient light intensity according to claim 1.

10. The non-transitory computer-readable storage medium according to claim 9, wherein the light sensing collecting time window has levels, and the levels of the light sensing collecting time window match screen brightness of the terminal.

11. The non-transitory computer-readable storage medium according to claim 9, wherein the sampling frequency is different from a screen refresh frequency of the terminal.

12. The non-transitory computer-readable storage medium according to claim 10, wherein the sampling frequency is different from a screen refresh frequency of the terminal.

13. A mobile terminal implementing the method for determining an ambient light intensity of claim 1, wherein the mobile terminal is configured to perform determination of the ambient light intensity on a basis of the time window.

14. The mobile terminal of claim 13, further comprising a liquid-crystal display (LCD) or an organic light-emitting diode (OLED) display touch screen, where the determination of the ambient light intensity on the basis of time window is not affected by screen light leakage, thereby improving display ratio of the screen.

* * * * *